(12) United States Patent  
Fateh

(10) Patent No.: US 9,925,549 B2
(45) Date of Patent: Mar. 27, 2018

(54) HEAD-MOUNTED DISPLAYS AND ATTACHMENTS THAT ENABLE INTERACTIVE SENSORY EXPERIENCES

(71) Applicant: Eye Labs, LLC, Mountain View, CA (US)

(72) Inventor: Sina Fateh, Mountain View, CA (US)

(73) Assignee: EYE LABS, LLC, Mountain View, CA (US)

( * ) Notice: Subject to any disclaimer, the term of this patent is extended or adjusted under 35 U.S.C. 154(b) by 0 days.

(21) Appl. No.: 15/469,397

(22) Filed: Mar. 24, 2017

(65) Prior Publication Data

US 2017/0266676 A1 Sep. 21, 2017

Related U.S. Application Data

(63) Continuation-in-part of application No. 15/081,556, filed on Mar. 25, 2016.

(Continued)

(51) Int. Cl.
*B05B 7/24* (2006.01)
*A63F 13/53* (2014.01)
(Continued)

(52) U.S. Cl.
CPC ............ *B05B 7/2497* (2013.01); *A63F 13/28* (2014.09); *A63F 13/53* (2014.09); *B05B 7/0081* (2013.01);
(Continued)

(58) Field of Classification Search
CPC ...... G02B 2027/014; G02B 2027/0178; G02B 27/017; G02B 27/0176; G06F 3/011; Y10S 428/905
See application file for complete search history.

(56) References Cited

U.S. PATENT DOCUMENTS 5,538,013 A 7/1996 Brannon
5,739,797 A 4/1998 Karasawa et al.
(Continued)

OTHER PUBLICATIONS

Final Office Action dated May 1, 2017, for U.S. Appl. No. 15/081,556 of Fateh, S., filed Mar. 25, 2016.
(Continued)

*Primary Examiner* — Viet Pham
(74) *Attorney, Agent, or Firm* — Perkins Coie LLP

(57) ABSTRACT

Introduced herein are techniques for producing sensory stimuli that increase the realism of content experienced by a user. Several embodiments pertain to scent delivery system that are able to dispense scented material(s) to the user. A scent delivery system could be a self-contained unit that is attachable to a head-mounted display (HMD) or could be integrated into the HMD itself. The scent delivery system can be used to improve the realism of content (e.g., visual content and audio content) presented to the user. More specifically, the scent delivery system can be configured to dispense one or more scented materials in response to determining a particular scene is being shown. Different scented materials can be dispensed based on characteristics of the content. In some embodiments, the scented material(s) are held in capsules that are housed within the scent delivery system. The capsules may be readily replaceable by the user.

30 Claims, 11 Drawing Sheets

Related U.S. Application Data

(60) Provisional application No. 62/311,347, filed on Mar. 21, 2016.

(51) Int. Cl.
 *A63F 13/28* (2014.01)
 *G06T 19/00* (2011.01)
 *B05B 7/00* (2006.01)
 *B05B 12/12* (2006.01)
 *B05B 12/00* (2018.01)

(52) U.S. Cl.
 CPC ............ *B05B 12/004* (2013.01); *B05B 12/12* (2013.01); *G06T 19/006* (2013.01); *A63F 2300/302* (2013.01); *A63F 2300/303* (2013.01)

(56) References Cited

U.S. PATENT DOCUMENTS

| | | | |
|---|---|---|---|
| 5,995,770 | A | 11/1999 | Rochford et al. |
| 6,602,475 | B1 | 8/2003 | Chiao et al. |
| 6,758,215 | B2 | 7/2004 | Begum |
| 2002/0018181 | A1 | 2/2002 | Manne |
| 2007/0066916 | A1 | 3/2007 | Lemos |
| 2010/0163034 | A1* | 7/2010 | Hyde ................ G06F 19/3462 128/203.14 |
| 2010/0309434 | A1 | 12/2010 | Van Schijndel et al. |
| 2014/0069420 | A1 | 3/2014 | Richter et al. |
| 2014/0285403 | A1 | 9/2014 | Kobayashi |
| 2015/0241708 | A1 | 8/2015 | Watanabe et al. |

OTHER PUBLICATIONS

Non-Final Office Action dated Dec. 13, 2016 for U.S. Appl. No. 15/081,556 of Fateh, S., filed Mar. 25, 2016.

U.S. Appl. No. 15/081,556 of Fateh, S., filed Mar. 25, 2016.

International Search Report and Written Opinion dated Sep. 7, 2017, for International Application No. PCT/US17/23209, 7 pages.

Notice of Allowance dated Oct. 13, 2017, for U.S. Appl. No. 15/081,556 of Fateh, S., filed Mar. 25, 2016.

Horsey, Julian, "Feelreal Virtual Reality Helmet Lets You Feel and Smell the Action (video)", https://www.geeky-gadgets.com/feelreal-virtual-reality-helmet-lets-you-feel-and-smell-the-action-01-05-2015/, May 1, 2015.

* cited by examiner

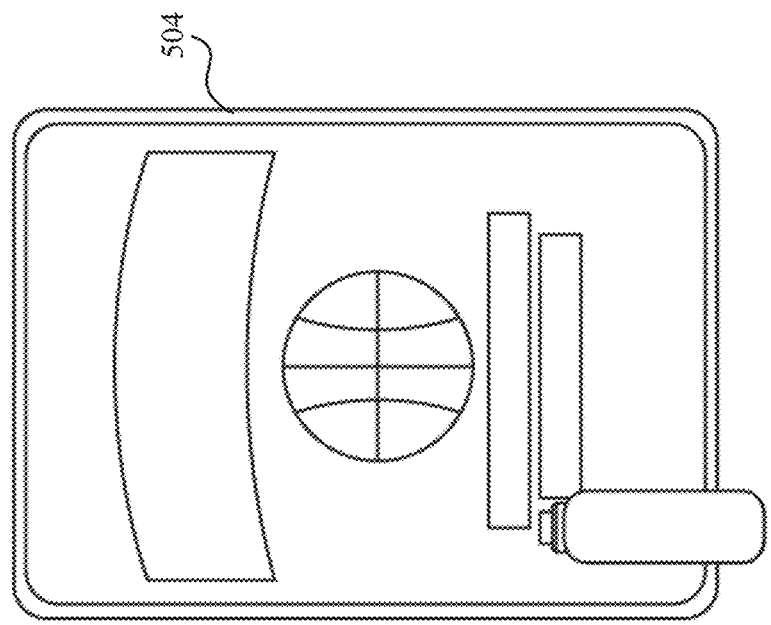
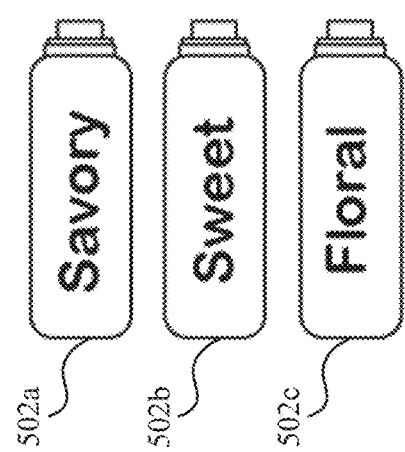
FIG. 5A

600

602

Provide a scent delivery system for an HMD

604

Enable a user to readily secure the scent delivery system to the HMD

606

Enable the user to readily replace one or more capsules housed within the scent delivery system

608

Allow the user the modify whether the scent feature is enabled or disabled

610

Cause the scent delivery system to dispense a scented material from at least one capsule when the scent feature is enabled

612

Facilitate dispersal of the scented material after a predetermined time period or in response to a user action

702
Receive an indication a scent feature has been enabled

704
Monitor the content presented by the HMD

706
Generate an output signal upon determining a keyframe has been reached

708
Transmit the output signal to scent circuitry

710
Cause a pump to dispense at least one scented material

712
Monitor the user's reaction to the scent

FIG. 7

HEAD-MOUNTED DISPLAYS AND ATTACHMENTS THAT ENABLE INTERACTIVE SENSORY EXPERIENCES

CROSS-REFERENCE TO RELATED APPLICATIONS

This application is a continuation-in-part of U.S. patent application Ser. No. 15/081,556 titled "SCENT DISPERSAL SYSTEMS FOR HEAD-MOUNTED DISPLAYS" and filed on Mar. 25, 2016, and claims priority to U.S. Provisional Patent Application 62/311,347 titled "HEAD-MOUNTED DISPLAYS THAT ENABLE INTERACTIVE SCENT EXPERIENCES" and filed on Mar. 21, 2016, each of which is incorporated by reference herein in its entirety.

RELATED FIELD

The present technology relates to display devices for digital content and, more specifically, display devices that enable users to participate in interactive scent experiences while viewing virtual or augmented reality content.

BACKGROUND

Smell is one of our strongest senses. Certain scents often remind us of moments (both good and bad) that we first experienced days, weeks, or years ago. Scents can also make be highly effective in helping us distinguish items or locations from one another.

Some businesses (e.g., production studios, movie theaters, and amusement parks) have long attempted to enhance interactive experiences by introducing scents. For example, "Smell-O-Vision" was a system that released scents during the projection of a film so that the viewer could "smell" what was happening in the movie. Similarly, the "Smellitizer" was developed by the Walt Disney Company to deliver faint scents on cue at certain locations, such as attractions (e.g., Soarin' Over California® at Disneyland®) and storefronts (e.g., Main Street Bakery). Scent dispersal systems such as these were often shown to heighten the realism of a fabricated experience, increase sales, and improve customer satisfaction.

Accordingly, entities across different industries have begun using scent as part of a multi-sensory marketing strategy designed to enhance an individual's experience (e.g., of a location or a particular product/service). These enhanced experiences allow customers to develop deeper memories and emotional connections with certain brands, products, services, locations, etc. In fact, some brands have begun using scent to distinguish themselves in the market. Such techniques are generally performed as part of a scent marketing campaign.

Scent marketing campaigns can typically be readily introduced by merchants who occupy a physical storefront. However, scent marketing becomes increasingly difficult as merchants complete more transactions electronically and reduce the number of physical storefronts. Said another way, the proliferation of electronic transactions has made scent marketing more difficult because scents must be delivered to prospective customers.

Scent has also been proposed as one way of increasing the realism of digital content that is experienced by an individual on a computing device, such as a mobile phone, television, or virtual/augmented reality headset. For example, an individual's sense of smell can be tricked by replacing unrelated real-world stimuli with controlled stimuli. But delivering these scents to the individual at the appropriate time(s) in the appropriate amount(s) using conventional technology is difficult and, in many instances, impossible.

Scent is simply one example of a sense that is typically isolated from experiencing content presented by a computing device. In fact, the realism of digital content (e.g., augmented or virtual reality content) has been limited because only a single sense (i.e., the visual sense) is engaged. Increasing the realism and engagement of various experiences will depend on effectively engaging multiple senses (e.g., the olfactory sense, the gustatory sense, and the visual sense) simultaneously or sequentially.

BRIEF DESCRIPTION OF THE DRAWINGS

Embodiments of the present invention are illustrated by way of example and not limitation in the accompanying drawings, in which like references indicate similar elements. Various objects, features, and characteristics of the present invention will become more apparent to those skilled in the art from a study of the following Detailed Description in conjunction with the accompanying drawings.

FIG. 5A depicts scent capsules that can be installed within a scent delivery system.

FIG. 6 depicts a process for attaching a scent delivery system to an HMD.

FIG. 7 depicts a process for dispensing one or more scented materials by a scent delivery system that is attached to an HMD.

Figure 1A:
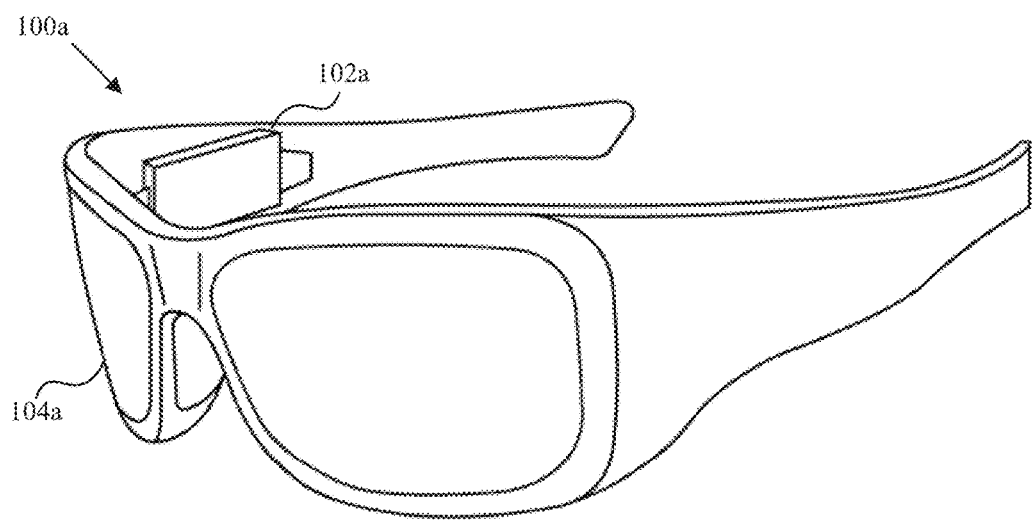
FIG. 1A depicts a conventional head-mounted display (HMD) that includes an image display system and an optical display surface configured to reflect light.

The figures depict various embodiments for the purpose of illustration only. One skilled in the art will readily recognize from the following Detailed Description that alternative embodiments of the technology illustrated herein may be employed without departing from the principles of the technology.

DETAILED DESCRIPTION

Introduced here are computer-implemented techniques and systems for increasing the realism of experiences involving digital content by dispensing scent(s). More specifically, scent delivery systems (also referred to as "scent-enabling units") are described herein that can dispense one or more scents based on the digital content being shown to an individual at a given point in time. A scent delivery system may be separately attachable to a computing device or may be integrated within the computing device itself.

Although many of the embodiments described herein involve head-mounted displays (HMDs), one skilled in the art will recognize that such embodiments have been selected for the purposes of illustration only. Such technology could be used in combination with any computing device that present digital content, including personal computers, tablet computers, personal digital assistants (PDAs), mobile phones, game consoles (e.g., Sony PlayStation® or Microsoft Xbox®), music players (e.g., Apple iPod Touch®), wearable electronic devices (e.g., a watch or fitness band), network-connected ("smart") devices (e.g., a television), virtual/augmented reality systems (e.g., Oculus Rift® or Microsoft Hololens®), or other electronic devices.

A scent delivery system can include one or more capsules or reservoirs of scented material (e.g., liquid or air) that can each be selectively dispensed by a pump at the appropriate time. That is, the scent delivery system includes pump(s) for controllably dispensing the scented material(s) in certain quantities/mixtures at certain times. For example, a pine scent could be dispensed when the individual is able to view a digital forest through the HMD, while a vanilla scent could be dispensed when the individual is able to view a digital kitchen through the HMD.

Unlike traditional scent dispersal systems (e.g., the Smell-O-Vision or the Smellitizer), the scent delivery systems described herein are readily portable and allow scents to be delivered directly to an individual user of an HMD. Said another way, traditional scent dispersal systems are designed to dispense scents in a single physical location, while the scent delivery systems introduced here can be used regardless of where the individual decides to experience digital content. Dispersal of the scents typically enhances the realism of digital content (e.g., augmented or virtual reality content) that is viewed by an individual by replacing unrelated real-world stimuli with controlled stimuli. Said another way, the scent dispersal systems increase the realism of digital content by tricking the user's olfactory sense (i.e., sense of smell). For example, an individual may smell certain predetermined combinations of scent(s) while viewing digital content on an HMD rather than scents that are emanating from a kitchen (which are completely unrelated to the digital content, and thus decrease realism).

Content (e.g., audiobooks and digital content, such as applications, games, and cinematic videos) may be specially designed for use with a computing device having a scent delivery system. In such embodiments, a processor can determine whether to dispense a scent based on instructions provided by a source of the content. In some embodiments the instructions are embedded within the content (e.g., in the metadata of a cinematic video), while in other embodiments the instructions are included in an instruction set that accompanies the content and is separately executable by the processor.

However, older, non-scented content could also be repurposed for use with a computing device having a scent delivery system. For example, an administrator (e.g., a designer, writer, or individual consumer of content) may be able to tag non-scented content to create keyframes that cause the scent delivery system to dispense scent(s). More specifically, the administrator could access a network-accessible interface and upload the non-scented content to a repurposing engine that analyzes the non-scented content and determines characteristics regarding how scent(s) should be dispensed. The characteristics could include, for example, how much of each scent should be dispensed (e.g., faint, medium, or strong aroma), when each scent should be dispensed, whether certain scent combinations should be created, etc. In some embodiments, the administrator is able to specify and/or modify these characteristics through the network-accessible interface.

Thus, non-scented content could be manually repurposed into scented content by an administrator and/or automatically repurposed into scented content by the repurposing engine. The repurposing engine may also engage in machine learning to identify keyframes, identify the appropriate scent(s) to be dispensed at those keyframes, etc. For instance, the repurposing engine may apply a Naïve Bayes Classifier algorithm, a K Means Clustering algorithm, a Support Vector Machine algorithm, linear regression, logic regression, artificial neural networks, etc. These machine learning algorithms/techniques may be chosen based on application (e.g., supervised or unsupervised learning) and optimized based on whether the administrator has confirmed automatically-selected keyframes, indicated the scent(s) created a more realistic/desirable experience, etc.

Terminology

Brief definitions of terms, abbreviations, and phrases used throughout the specification are given below.

Reference in this specification to "one embodiment" or "an embodiment" means that a particular feature, structure, or characteristic described in connection with the embodiment is included in at least one embodiment of the disclosure. The appearances of the phrase "in one embodiment" are not necessarily referring to the same embodiment, nor are they necessarily referring to separate or alternative embodiments that are mutually exclusive of one another. Moreover, various features are described that may be exhibited by some embodiments but not others. Similarly, various requirements are described that may be requirements for some embodiments but not others.

Unless the context clearly requires otherwise, the words "comprise," "comprising," and the like are to be construed in an inclusive sense, rather than an exclusive or exhaustive sense (i.e., tin the sense of "including, but not limited to"). The terms "connected," "coupled," or any variant thereof includes any connection or coupling, either direct or indirect, between two or more elements. The coupling or connection between the elements can be physical, logical, or a combination thereof. For example, two devices may be coupled directly to one another or via one or more intermediary channels/devices. As another example, two devices may be coupled in such a way that information can be passed there between, despite not sharing any physical connection with one another. The words "associate with," meanwhile, mean connecting or relating objects, items, etc.

Where the context permits, words used in the singular sense or the plural sense may also be used in the plural sense or the singular sense, respectively. The word "or," in reference to a list of two or more items, covers all of the following interpretations of the word: any of the items in the list, all of the items in the list, and any combination of the items in the list. If the specification states a component or feature "may," "can," "could," or "might" be included or have a characteristic, that particular component or feature is not required to be included or have the characteristic in every embodiment.

The term "module" refers broadly to software, hardware, and/or firmware components. Modules are typically functional components that can generate useful data or other output using specified input(s). A module may or may not be self-contained. A software program or application may include one or more modules.

The terminology used in the Detailed Description is intended to be interpreted in its broadest reasonable manner, even though it is being used in conjunction with certain embodiments. The terms used in this specification generally have their ordinary meanings in the art, in the context of the disclosure as a whole and in the specific context where each term is used. For convenience, certain terms may be highlighted using, for example, capitalization, italics, and/or quotation marks. The use of highlighting has no influence on the scope and meaning of a term; the scope and meaning of a term is the same, in the same context, whether or not it is highlighted.

Consequently, although alternative language and synonyms may be used for some terms. Although synonyms for certain terms may be provided, special significance is not to be placed upon whether or not a term is elaborated or discussed herein. A recital of one or more synonyms does not exclude the use of other synonyms. The use of examples anywhere in this specification, including examples of any terms discussed herein, is illustrative only. These examples are not intended to limit the scope and meaning of the disclosure or of any exemplified term. Likewise, the disclosure is not limited to various embodiments described in this specification.

System Overview

Figure 1B:
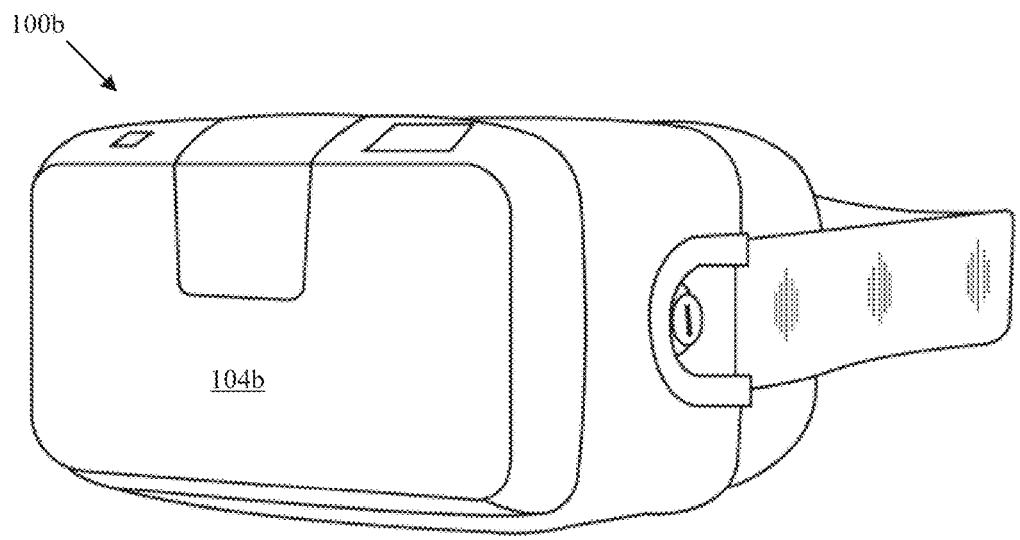
FIG. 1B depicts a conventional HMD that includes an image display system and an optical display surface configured to reflect light.

FIGS. 1A-B depict conventional head-mounted displays (HMDs) 100a-b that each include an image display system 102a and an optical display surface 104a-b configured to reflect or emit light. Some conventional HMDs are designed so that digital content emitted by the image display system 102a is reflected by the optical display surface 104a-b towards the user's eyes. Other conventional HMDs are designed so that digital content created/processed by the image display system 102a is projected directly into the user's eyes by the optical display surface 104a-b.

Conventional HMDs 100a-b can cover one or both of the user's eyes. More specifically, binocular HMDs present a separate image to each of the user's eyes, while bi-ocular HMDs present a single image to both of the user's eyes, and monocular HMDs present a single image to only one of the user's eyes. However, as shown by FIGS. 1A-B, conventional HMDs 100a-b do not cover the user's nose or mouth, which separates or isolates the user's critical senses. For example, the HMDs 100a-b shown here isolate the user's olfactory sense (i.e., sense of smell) and gustatory sense (i.e., sense of taste) from the user's visual sense.

Consequently, a user of a conventional HMD will continue to receive stimuli from the real world that can disrupt the realism of the augmented or virtual reality content shown by the HMD. In fact, some of these stimuli may be partially or entirely counter to what the user expects. For example, the user might smell a fried chicken scent that is emanating from the kitchen while viewing a virtual environment (e.g., the inside of an spaceship) through an HMD. Unrelated stimuli are likely to cause the user to have a disjointed and unrealistic experience while using the HMD.

HMDs can be configured to display two different types of digital imagery.

First, some HMDs are configured to display simulated (e.g., computer-generated) digital images that together form an entirely virtual environment. This is referred to as "virtual reality." Virtual reality generally requires the user wear a helmet, goggles, or some other headwear that forms an enclosed area around the user's eyes, thereby blocking out the real-world. Second, some HMDs are configured to display simulated (e.g., computer-generated) images that are superimposed onto real world content perceived by the user. This is referred to as "augmented reality." Augmented reality allows the user to concurrently view virtual imagery and real world imagery and, in some instances, interact with virtual content that relates to what is seen the real world. Generally, the user is able to distinguish between the virtual content and the real world imagery. For example, augmentation may take place through superposition of a simulated image on a non-simulated, real world environment. The simulated image may allow the user to view additional data relevant to a desired task, the non-simulated, real world environment, etc. The simulated image could also be adapted to allow for user interaction. However, augmented and virtual reality experiences are generally limited in how realistic they are because they are largely visual experiences.

HMD systems fall into three general categories: binocular systems, bi-ocular systems, and monocular systems. Binocular HMD systems present a separate image to each of the user's eyes, while bi-ocular HMD systems present a single image to both of the user's eyes, and monocular HMD systems present a single image to only one of the user's eyes. One skilled in the art will recognize that the systems and techniques described herein can be adapted for any of these systems. The use of one or more of these terms in describing an embodiment is for the purposes of illustration only.

HMDs enable users to more easily interact with augmented or virtual reality assets. The assets can include, for example, network-accessible interfaces (e.g., that are accessible through a web browser), software programs/applications, video games, and cinematic videos. HMDs could also be designed to facilitate non-visual experiences as well. For example, many conventional HMDs include (or can be easily paired with) headphones or speakers through which audio assets (e.g., songs and audiobooks) can be projected.

Figure 2A:
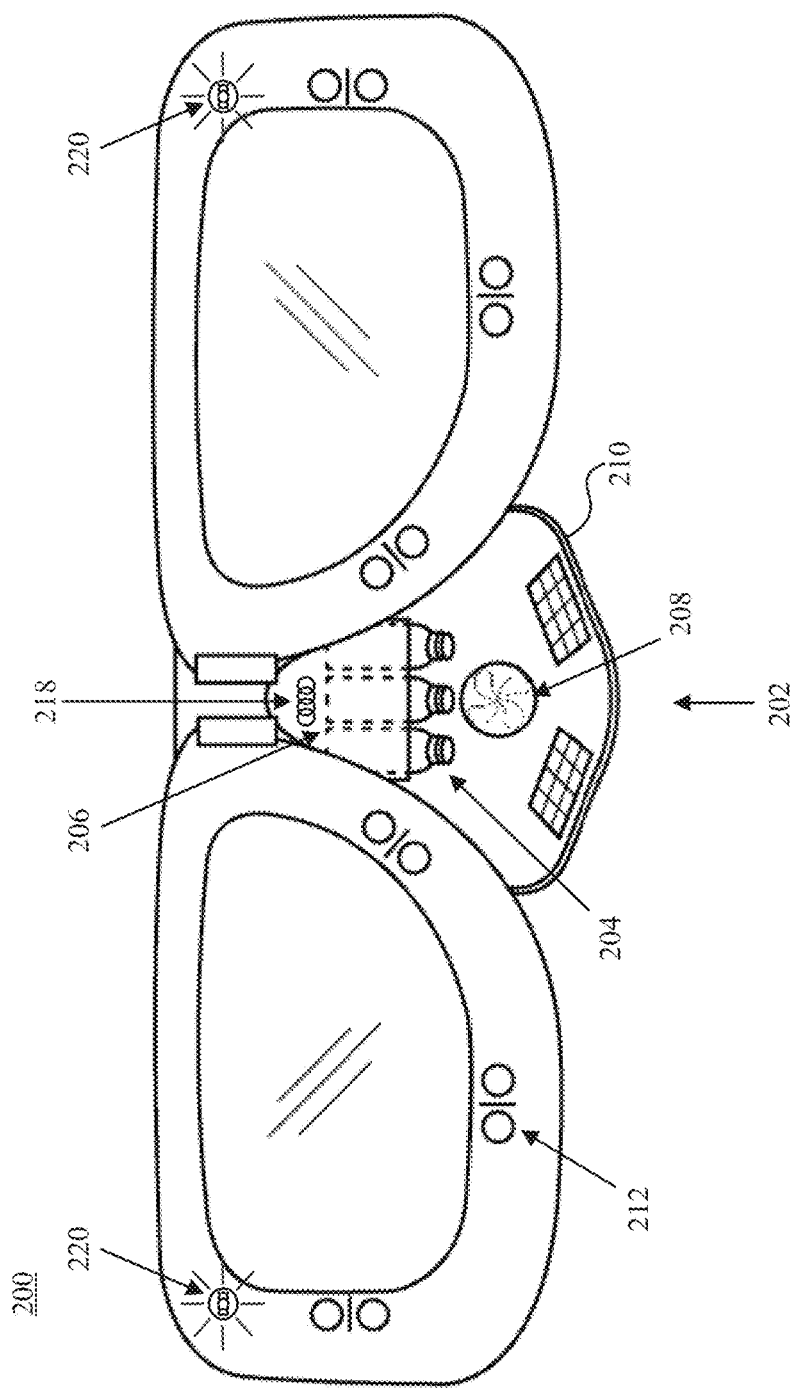
FIG. 2A is an inside view of a binocular HMD that includes a scent delivery system.
Figure 2B:
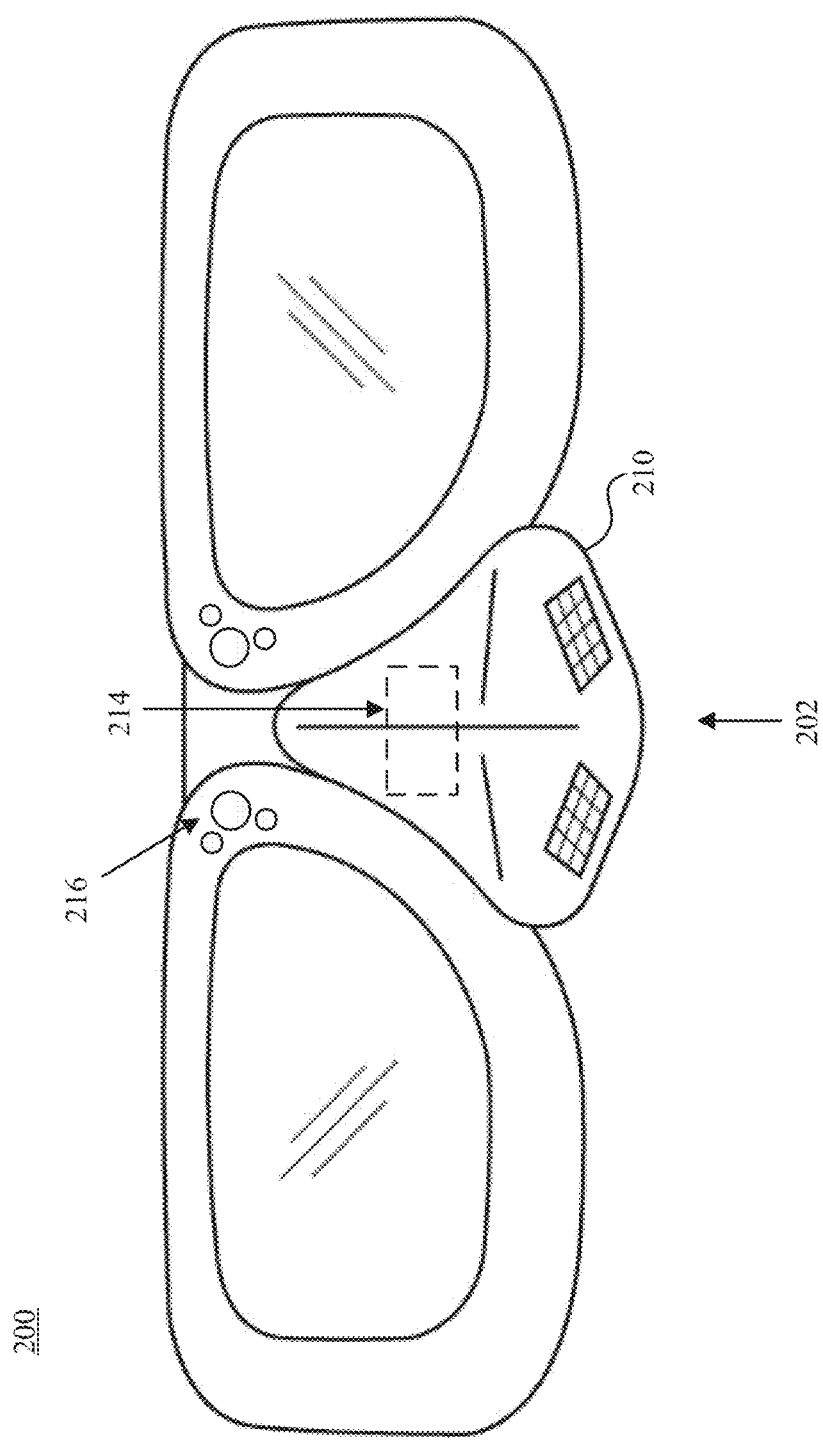
FIG. 2B is a front view of the binocular HMD that includes a scent delivery system.

FIG. 2A is an inside view of a binocular HMD 200 that includes a scent delivery system 202. FIG. 2B is a front view of the binocular HMD 200 that includes a scent delivery system 202. The scent delivery systems described herein enhance the realism of digital content (e.g., augmented or virtual reality content) shown to a user by replacing real-world stimuli with controlled stimuli that are related to the digital content being viewed by the user. Said another way, the scent delivery systems can increase the realism of digital content by tricking the user's olfactory sense (i.e., sense of smell).

As further described below, the scent delivery system 202 can be completely self-contained or could be integrated into the binocular HMD 200. For instance, in some embodiments the scent delivery system 202 is detachably connectable to the frame of the binocular HMD 200 using one or more fasteners (e.g., magnets, mechanical clips/tracks, or some other quick release mechanisms). The fastener(s) allow the scent delivery system 202 to be readily attached to, and then removed from, the binocular HMD 200 without the use of tools. For example, the structural frame of the binocular HMD 200 may include fasteners (e.g., cavities) configured to mate with corresponding features (e.g., protrusions) of a scent delivery system 202. In other embodiments, the scent delivery system 202 is fixedly attached to the frame of the binocular HMD 200 using, for example, screws, nuts and bolts, or an adhesive material.

Additionally or alternatively, some or all of the components that enable scent to be dispensed (e.g., pumps, reservoirs, and/or fans) could be integrated within the HMD. For example, the pump(s) and reservoir(s) may be integrated into the structural frame of an HMD (and thus no attachment may be necessary). In such embodiments, the pump(s) may be disposed such that scent(s) are ejected toward the user's nose.

One skilled in the art will recognize that embodiments involving a binocular HMD are described herein for the purposes of illustration only. The scent delivery systems and computer-implemented techniques described herein are equally applicable to monocular HMDs, bi-ocular HMDs, and other computing devices (e.g., mobile phones, televisions, and wearable devices). In some embodiments, the scent delivery system 202 is customizable for a particular user, a particular type of experience (e.g., augmented or virtual reality content), a particular HMD (e.g., Oculus Rift® or Microsoft Hololens®), etc.

The scent delivery system 202 can be designed so that it partially or entirely covers the user's nose. For example, FIGS. 2A-B depict a scent delivery system 202 that completely envelops the user's nose. However, the scent delivery system 202 could instead be designed so that the base of the user's nose is exposed. In some embodiments, some of the components (e.g., the pumps 204, reservoirs 206, and/or fan 208) are integrated into the structural frame of the binocular HMD 200 so that the binocular HMD 200 appears similar to a conventional HMD (e.g., the HMDs of FIGS. 1A-B) despite supporting scent functionality.

More specifically, the scent delivery system 202 can include a structural frame 210, one or more pumps 204, one or more reservoirs 206, and a fan 208. The structural frame 210 can include features that allow the scent delivery system 202 to be readily connected to, and then removed from, the binocular HMD 200. For example, the structural frame 210 could include fasteners (e.g., detents or cavities) configured to mate with corresponding features (e.g., protrusions) of the scent delivery system 202. Examples of fasteners include magnets, mechanical clips/tracks, and other quick release mechanisms. In other embodiments, the scent delivery system 202 is fixedly attached to the structural frame 210 using screws, nuts and bolts, adhesive materials/substances, etc.

The pump(s) 204 allow a scented material (e.g., liquid or air) stored in the reservoir(s) 206 to be dispensed in a controlled manner. For example, the pump(s) 204 could dispense scented liquids in particular quantities, at particular temperatures, with particular forces, etc. In fact, the pump(s) 204 could be collectively controlled by scent circuitry that can intelligently cause dispersal of a single scented material and combinations of multiple scented materials. Said another way, the pump(s) 204 could sequentially or simultaneously dispense the scented materials stored in the reservoir(s) 206.

In some embodiments the pump(s) 204 spray a scented material directly toward the user's nose, while in other embodiments the pump(s) 204 spray the scented material within the internal cavity of the structural frame 210 (in which case the fan 208 could direct the scented material towards the user's nose or away from the user's nose). As further described below, the pump(s) 204 may dispense a small quantity of a single scented material when a slight aroma is desired, a large quantity of a single scented material when a strong aroma is desired, small or large quantities of multiple scented materials simultaneously, etc.

Scent could also or instead be delivered via small absorbent pads that are connected to the reservoir(s) 206 and are disposed near the user's nose. For example, one or more absorbent pads could be affixed on an interior surface of the structural frame 210 of the scent delivery system 202 (i.e., within the internal cavity). Unlike the pump(s) 204 (which are able to selectively dispense scented materials at certain times), the absorbent pads typically continually dispense small amounts of scented material.

The reservoir(s) 206 generally retain air or liquid having different scents. For example, the three reservoirs depicted in FIGS. 2A-B may correspond to general scents (e.g., sweet, savory, and floral), specific scents (e.g., cinnamon, citrus, and roses), or some combination thereof. Moreover, the reservoirs may be readily replaceable by the user or some other entity (e.g., the manufacturer of the HMD or a service representative). In such embodiments, the reservoirs could be replaced by "capsules" of scented material that are easily replaceable and enable the user to customize which scent(s) can be created by the scent delivery system 202.

Note, however, that one or more of the reservoir(s) 206 could also include a non-scented material (e.g., water) or a neutrally-scented material that is controllably dispensed within the internal cavity to neutralize other scents. For example, a neutralizing scent (also referred to as a "cleansing scent") may be created to eliminate particularly strong scents (e.g., a smoke odor or food-based odor) or unwanted scents (e.g., a skunk odor) the user is unlikely to want to linger. The neutrally-scented material could also include particles (e.g., natural oils) that eliminate scents by attaching to odor molecules to form a neutral compound. Neutrally-scented material(s) are often circulated by the fan 208 to more quickly flush scent(s) from the internal cavity of the structural frame 210.

In some embodiments, the scented material(s) stored in the reservoir(s) 206 also include a flavor compound having a particular taste. Thus, the user may experience content using her visual, olfactory, and/or gustatory senses. For example, when the user views a digital environment that includes a citrus grove, the binocular HMD 200 may dispense a material (e.g., air or liquid) having a citrus scent and/or a citrus taste. Scent and taste could be facilitated by a single material or multiple materials. For example, the binocular HMD 200 could include one reservoir that stores a material having a scent-enabling compound and another reservoir that stores a material having a taste-enabling compound. As another example, the scent-enabling compound and the taste-enabling compound may both be included in the same material that is stored in a single reservoir.

The fan 208 could be set to continuously or periodically circulate air around the user's nose. For example, the fan 208 may only circulate air when the scent delivery system 202 begins dispensing scented material(s) or when the user enables the fan 202 (e.g., turns a fan setting to "on"). In some embodiments, the structural frame 210 includes one or more openings (also referred to as "breaks" or "outlets") that allow air to more easily circulate through the internal cavity of the structural frame 210. These opening(s) may be strategically positioned with respect to the user's noise (e.g., near the nostrils as shown in FIGS. 2A-B) or with respect to the pump(s) 204 and/or fan 208.

The fan 208 may also be used to modify the airflow in or around the internal cavity of the structural frame 210. Different attributes (e.g., acceleration, velocity, and temperature) could be modified to simulate wind that is included in content presented by the binocular HMD 200. For example, the fan 208 may intelligently switch between several fan settings to simulate different airflows while the user plays a racing video game. The fan 208 may perform such actions in combination with the pump(s) 204. For example, the fan 208 may cause high airflow and a pump may dispense a material having a salty flavor (e.g., a salty smell, a salty taste, or both) while the binocular HMD 200 presents appropriate content, such as a cinematic video involving the ocean or a video game involving a golf course near the coast.

In some embodiments, the binocular HMD 200 also includes other structural features or components that enhance the user experience. For example, the binocular HMD 200 may include one or more sensors 212 that are positioned proximate to the user's face. The sensor(s) 212 can measure skin temperature, temperature within the internal cavity, humidity, motion, etc. Scent circuitry 214 may be responsible for modifying which scented material(s) are dispensed, how much of each scented material is dispensed, etc., based on signals received from each of the sensor(s) 212. For example, if the sensor(s) 212 indicate that the skin temperature has begun to rise and the user has begun to sweat, the scent circuitry 214 may lessen the amount of scented material dispensed by each pump to avoid overstimulation of the user's senses. As another example, if the sensor(s) 212 indicate that the user has begun to move her head toward the scent source (e.g., toward a flower shown in the digital content), the scent circuitry 214 may increase the amount of scented material dispensed by each pump to increase scent intensity.

The scent circuitry 214 (which may also be referred to as an "electronics module") can process signals generated by each of the sensor(s) 212 and optimize the delivery of scented material(s) by the pump(s) 204. The scent circuitry can include a power supply (e.g., a battery or an electrical coupling to the power supply of the HMD), memory, one or more processors, and/or a communication module that allows the scent delivery system 202 to communicate with the binocular HMD 200 and/or another computing device (e.g., a mobile phone, tablet, personal computer, or server). Accordingly, the communication module may allow the scent delivery system 202 to communicate over the Internet, a local area network (LAN), a wide area network (WAN), a point-to-point dial-up connection, a cellular network, etc. Additionally or alternatively, the communication module may communicate via a short range protocol (e.g., near-field communication (NFC), radio-frequency identification (RFID), Bluetooth).

Scented material(s) are preferably dispensed by the pump(s) 204 responsive to what content is being shown or projected by the binocular HMD 200. For example, the scent circuitry 214 may specify that a floral scent should be dispensed when a flower is shown in a cinematic video. As another example, the scent circuitry 214 may specify that a pine scent should be dispensed when a character in an audio recording (e.g., an audiobook) enters a forest. The scent circuitry 214 (as well as the other components of the scent delivery system 202) may be powered through a wired or wireless medium. For example, in some embodiments the scent circuitry 214 includes an internal power supply (e.g., a rechargeable battery or a single cell (i.e., button cell) battery), while in other embodiments the scent circuitry is electrically coupled to, and powered by, the binocular HMD 200.

In some embodiments, the binocular HMD 200 includes one or more heating elements 218 that are disposed near the reservoir(s) 206 and/or pump(s) 204. The heating element(S) 218 allow the materials stored in the reservoir(s) 206 to be dispensed at certain temperatures or in certain forms. For example, a heating element could be used to produce steam from water stored in a reservoir to increase the humidity within the internal cavity of the structural frame 210.

One or more sensors 216 could also be disposed on the outer surface of the scent delivery system 202 and/or the binocular HMD 200. The sensor(s) 216 may monitor various aspects of the user's ambient environment. For example, the sensor(s) 216 may include a camera configured to capture the user's interactions with the local environment, a light sensor configured to track ambient illuminance levels, an audio sensor configured to sense vocal commands, etc. One skilled in the art will recognize that many other types of sensors could be included and, in some instances, may be preferred. The type(s) of sensor(s) 216 could be chosen based on whether the HMD system is adapted for a particular application. For example, an HMD designed for outdoor use may include a temperature sensor and a wind sensor to determine whether additional scented material needs to be dispensed to counteract a windy environment.

Unlike traditional scent dispersal systems (e.g., the Smell-O-Vision or Smellitizer), the technologies described herein are readily portable and allow scents to be delivered directly to an individual user of an HMD. Said another way, traditional scent dispersal systems are designed to dispense scents in a single physical location, while the scent delivery systems introduced here can be used regardless of where the user devices to experience content. Moreover, because the scent can be delivered locally (i.e., targeted to a particular user), other individuals who are nearby are not able to smell the dispensed scent(s) (and are thus undisturbed). Consequently, multiple users can experience realistic digital content (e.g., augmented or virtual reality content) in close proximity to one another despite having different preferences. For example, some users may enable the scent functionality while other users may opt to refrain from scented experiences.

As shown in FIG. 2A, in some embodiments the binocular HMD 200 includes one or more lighting elements 220 that are installed near the edges of the optical display surface. By intelligently illuminating the lighting element(s) 220, the binocular HMD 200 can make the user believe as though the optical display surface is larger than it truly is. The lighting element(s) 220 are generally adjustable, thereby enabling the binocular HMD 200 to establish a controlled lighting environment. Moreover, the lighting element(s) 220 can be used to further increase the realism of content presented by the binocular HMD 200 in several different respects. For example, the lighting element(s) 220 could serve as a bias light or backlight by illuminating the periphery of the user's vision based on the digital content being shown (e.g., using a color that matches or complements colors of the digital content). As another example, the lighting element(S) 220 could provide additional sensory stimuli (e.g., bright bursts of light in the user's peripheral vision during an action movie or shooter video game). The lighting element(s) 220 could produce white light and/or colored light.

Figure 3:
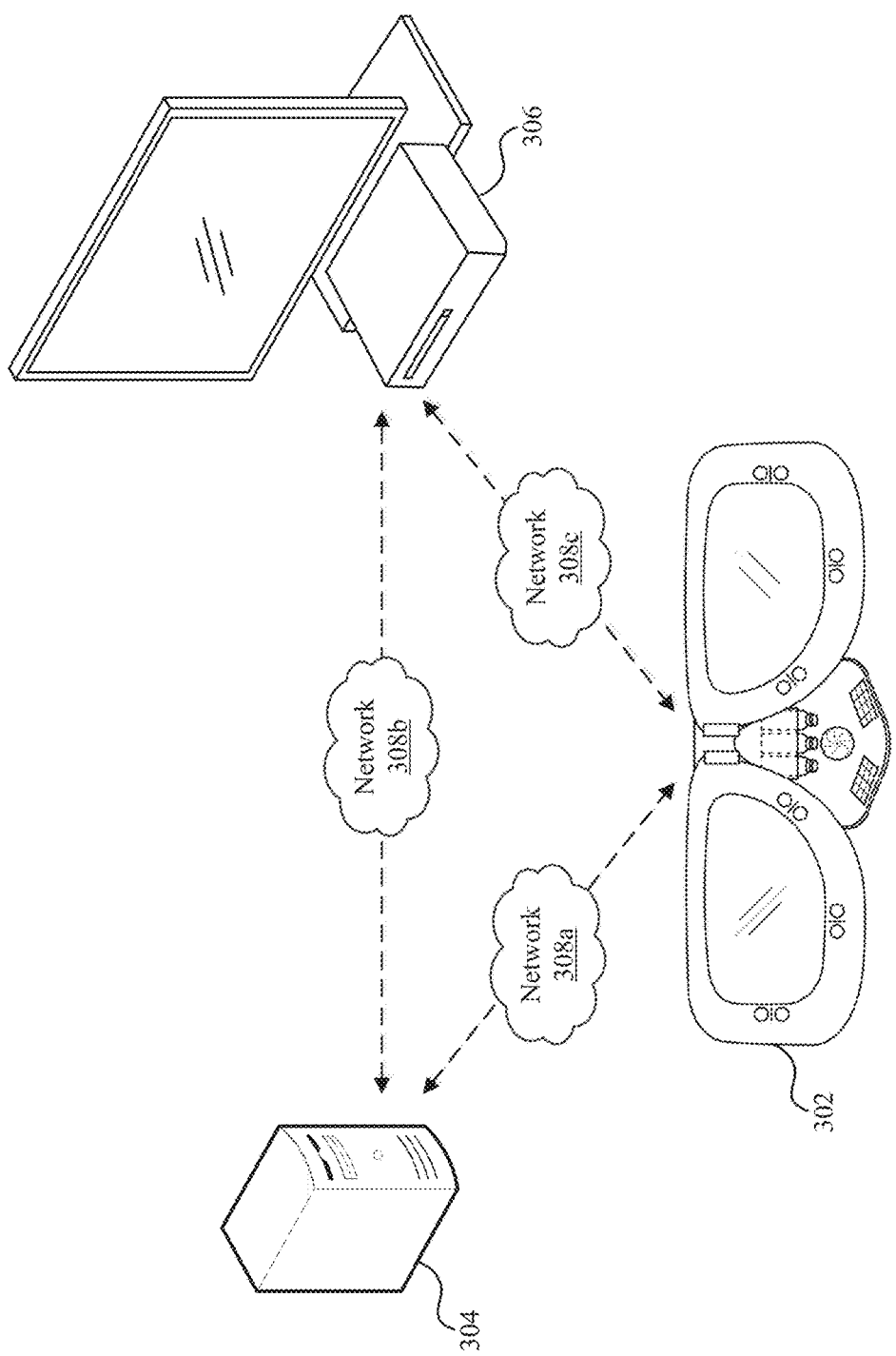
FIG. 3 depicts an example of a network environment that includes an HMD having a scent delivery system, a content server, and another computing device.

FIG. 3 depicts an example of a network environment that includes an HMD 302 having a scent delivery system, a content server 304, and another computing device 306 (here, a television and game console). The HMD 302, content server 304, and/or computing device 306 can be connected via one or more computer networks 308a-c, which may include the Internet, local area networks (LANs), wide-area networks (WANs), metropolitan area networks (MANs), cellular networks, etc. Additionally or alternatively, the HMD 302, content server 304, and/or computing device 306 may communicate with one another over a short-range communication protocol, such as Bluetooth, Near Field Communication (NFC), etc. Examples of computing devices 306 include, for example, mobile phones, tablet computers, laptop computers, personal computers, network-connected ("smart") televisions, game consoles (e.g., Sony PlayStation® or Microsoft Xbox® game console), network-connected mobile gaming devices (e.g., Sony PSP®), television-connected devices (e.g., Roku®, Apple TV®, Google Chromecast®, Amazon FireStick®, Android TV®, Blu-ray Disc™ players), other network-connected devices having an interface (e.g., Apple iPod Touch® and Apple Watch®), etc.

Generally, the HMD 302 is responsible for generating and presenting content to a user. While the content is typically in the form of augmented or virtual reality content, other forms of content (e.g., cinematic videos, real-time video feeds, audiobooks, and music) could also be presented to the user. The content server 304 and/or the computing device 306 can be coupled, wired or wirelessly, to the HMD 302. For example, the HMD 302 may be communicatively coupled to the computing device 306 via an antenna, wireless communication module, etc. In some embodiments the content server 304 and/or the computing device 306 are responsible for delivering content to the HMD 302, while in other embodiments the HMD 302 stores some or all of the content locally (e.g., within a memory).

When the HMD 302 is configured to generate virtual reality content, it may only be communicatively coupled to the content server 304. However, when the HMD 302 is configured to generate augmented reality content, it could be communicatively coupled to the content server 304 and/or the computing device 306. Consequently, the user of the HMD 302 may be able to see augmented reality content when viewing video, listening to audio, or playing video games using the computing device 306. Moreover, in some instances the computing device 306 presents content to the user while the HMD 302 simply enhances the realism of the content by generating sensory stimuli (e.g., scents, tastes, and/or visual effects). That is, the HMD 306 may improve the user experience without presenting content itself.

As noted above, in order to make these experiences more realistic, the HMD 302 (and, more specifically, the scent delivery system) may be configured to dispense one or more scents in particular instances. For example, the HMD 302 could dispense a floral scent when a virtual garden is viewable within a digital environment presented by the HMD 302. As another example, the HMD 302 could dispense a vanilla scent and a cinnamon scent when digital content is presented by the HMD 302 that augments a cooking show shown by a television in the real world. Further yet, the HMD 302 could dispense a pine scent, a grass scent, or a saltwater scent when the user watches a golf show on a television in the real world (and no content is being shown by the HMD). In fact, the HMD 302 may switch between these scents as golfers play different holes in different environments. Thus, the HMD 302 may dispense scents regardless of whether it is currently responsible for displaying digital content to a user.

The strength, direction, and frequency of the sensory stimuli produced by the HMD 302 generally correspond to features of the content that is presented to the user by the HMD 302 and/or other computing device 306. In some embodiments the instructions for producing the sensory stimuli are produced by a source of the content, while in other embodiments the instructions for producing the sensory stimuli are created (e.g., by the HMD 302 or the other computing device 306) after analyzing the content to identify elements that are indicative of a sensory stimuli source. The instructions may be embedded in the content (e.g., in the metadata of a cinematic video) or included in a separate file that accompanies the content.

Figure 4:
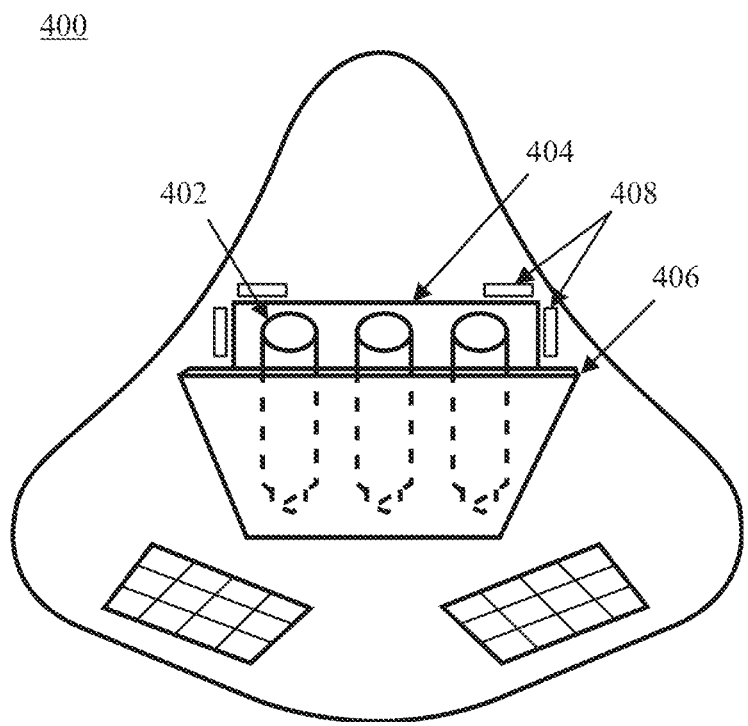
FIG. 4 depicts a scent delivery system that can be affixed to an HMD configured to display augmented or virtual reality content.

FIG. 4 depicts a scent delivery system 400 that can be detachable connected to an HMD configured to display augmented or virtual reality content. The scent delivery system 400 can include a compartment 404 that is able to hold one or more reservoirs 402 of scented material (e.g., air or liquid). Each scent may correspond to a separate, interchangeable "capsule" that can be easily removed from the scent delivery system 400. The removable capsules may correspond to a general scent or a specific scent.

As shown in FIG. 4, the reservoirs 402 are often retained within a compartment 404 that is readily accessible to the user. For example, the scent delivery system 400 may include a door 406 that can be securely closed via fasteners 408, such as magnets, mechanical clips/tracks, an adhesive material, etc. The door 406 enables the user to readily replace the reservoirs 402 in response to determining new scents are desired or necessary for content that is to be presented by the HMD. For example, the user may wish to replace some or all of the reservoirs 402 prior to watching a cinematic video, playing a video game, or interacting with augmented or virtual reality content.

The scent delivery system 400 may also dispense scents from the reservoirs 402 in order to affect the user's sense of taste. HMDs that show virtual reality content prevent users from being able to see their hands (and, more specifically, what they are eating or drinking while viewing the digital content). However, there is a strong physiological connection between different sources of sensory information. For instance, the ability to recognize flavors is often affected by visual information and olfactory information. The HMDs and scent delivery systems described herein can make use of these physiological connections to trick the user's senses.

For example, a user could be tricked into believing that water is a sweeter drink by having the HMD display a sweet drink and/or by having the scent delivery system 400 dispense a sweet scent. Similarly, the user could be tricked into believing a wine is much stronger or better than it actually is (e.g., by presenting a picturesque vineyard and/or dispensing an appropriate smell). The scent delivery systems described herein can be used to make generally bland foods seem more salty, spicy, bitter, or sour by modifying the content that is presented to the user by the HMD and/or the scent(s) that are dispensed by the scent delivery system 400.

As noted above, the scent delivery system 400 could also store materials that include a flavor compound having a particular taste. Consequently, visual, olfactory, and/or gustatory experiences can be selectively modified in order to improve the user experience (e.g., by enhancing good flavors or replacing bad flavors). In some embodiments the scent delivery system 400 includes separate reservoirs for storing materials having a scent-enabling compound and materials having a taste-enabling compound, while in other embodiments the scent-enabling compound and the taste-enabling compound are included in the same material that is stored in a single reservoir.

FIG. 5A depicts capsules 502a-c of scented material (e.g., liquid or air) that can be installed within a scent delivery system. As noted above, the capsules may correspond to general scents (e.g., sweet, savory, and floral) or specific scents (e.g., cinnamon, pine, and roses). Similar scents are often sufficient to enable a user to accurately remember or replicate previous experiences. Thus, a scent delivery system may be configured to dispense a floral scent regardless of whether the HMD is displaying a garden of roses or a field of tulips. Most individuals imprint their prior knowledge on basic scents (and, thus, do not need to experience a specific scent in order to believe an experience is authentic). For example, a general sweet scent could be sufficient to trick the user regardless of whether the digital content being shown involves cakes, cookies, candy, etc.

The capsules 502a-c could also be designed to be experienced in conjunction with certain content (e.g., audio files, cinematic videos, or interactive digital content, such as augmented or virtual reality content). Consequently, one or more capsules could be distributed with movies, audiobooks, video games, etc., that are to be experienced via an HMD or some other computing device (e.g., computing device 306 of FIG. 3). For example, a sports-themed video game 504 could be packaged with a capsule that includes a hot dog scent or a popcorn scent (or some other scent that would be commonly experienced at an athletic event). Similarly, a baking-themed television program could be packaged with a capsule having a general sweet scent or multiple capsules corresponding to specific scents, such as cinnamon, vanilla, and chocolate.

The capsule(s) 502a-c can be acquired in several different ways. For example, the user may acquire one or more capsules when purchasing a physical copy of the content (e.g., a compact disc (CD), digital video disc (DVD), or Blu-ray Disc™). As another example, the user may download an instruction set for dispensing scented material(s) upon purchasing a digital copy of the content. In such embodiments, the instruction set may specify different combinations of scents that are commonly available (i.e., the source of the content may rely on the user already having certain scented material(s) available). The instructions may be embedded in the content (e.g., in the metadata of a cinematic video) or included in a separate file that is downloaded along with the digital copy of the content.

Figure 5B:
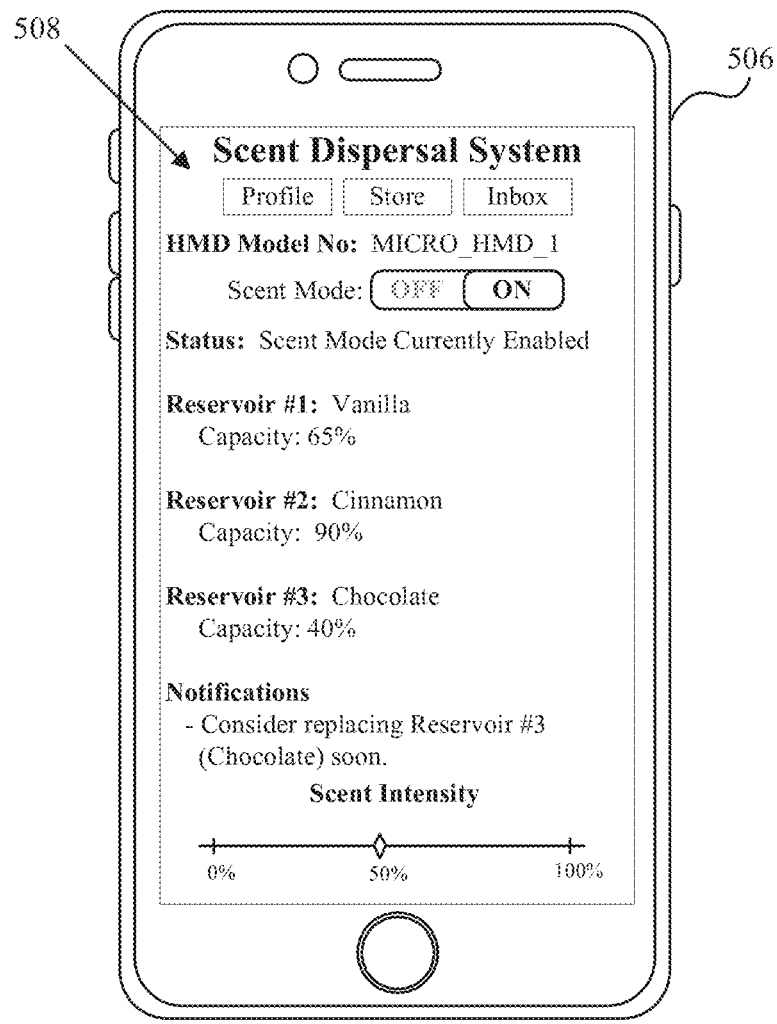
FIG. 5B depicts an interface that is associated with an HMD configured to dispense scent(s).

FIG. 5B depicts a user device 506 that is able to access an interface 508 for interacting with an HMD and/or a scent delivery system. The interface 508 may allow a user to customize a sensory experience, such as an olfactory experience enabled by content that supports scent functionality (e.g., sports-themed video game 504). For example, the user may opt to decrease the intensity of the dispensed scent(s) or disable scent functionality in its entirety. The interface 508 may also allow the user to ensure that the scent delivery system and/or the relevant content are appropriately connected/uploaded to the HMD. The interface 508 may also enable the enable or modify other sensory experiences (e.g., gustatory experiences or touch experiences, such as simulated wind or rain).

One skilled in the art will recognize that entirely new experiences can also be developed for HMDs that are able to dispense scent(s). For example, a first user could visit a virtual flower shop where the first user is able to select a digital flower that is subsequently delivered to a second user. The digital flower may be associated with a certain scent that is dispensed when the second user receives the digital flower and attempts to smell it. Delivery of the digital flower and/or dispersal of the certain scent could be manually triggered by the first user or automatically triggered by a software program that monitors the second user's reactions to receiving the digital flower. Olfactory experiences like this could be (and often are) paired with visual, audible, tactile, and/or gustatory experiences to increase realism.

In some embodiments, the scent delivery system and/or the HMD is programmable through a network-accessible interface that is accessible via a web browser, a mobile application, a desktop software program, or over-the-top (OTT) application. For example, if the digital flower is intended to be a gift on the second user's birthday, the first user could set the delivery for a particular day or time.

The same interface (or an entirely different interface) may allow a user to adjust the concentration or amount of scented material(s) dispensed by the scent delivery system. For example, the user might elect to decrease the intensity of scent(s) created by the scent delivery system or prevent certain types of scents (e.g., floral scents or salty scents) from being created, such as those scents to which the user is sensitive or allergic.

Figure 5C:
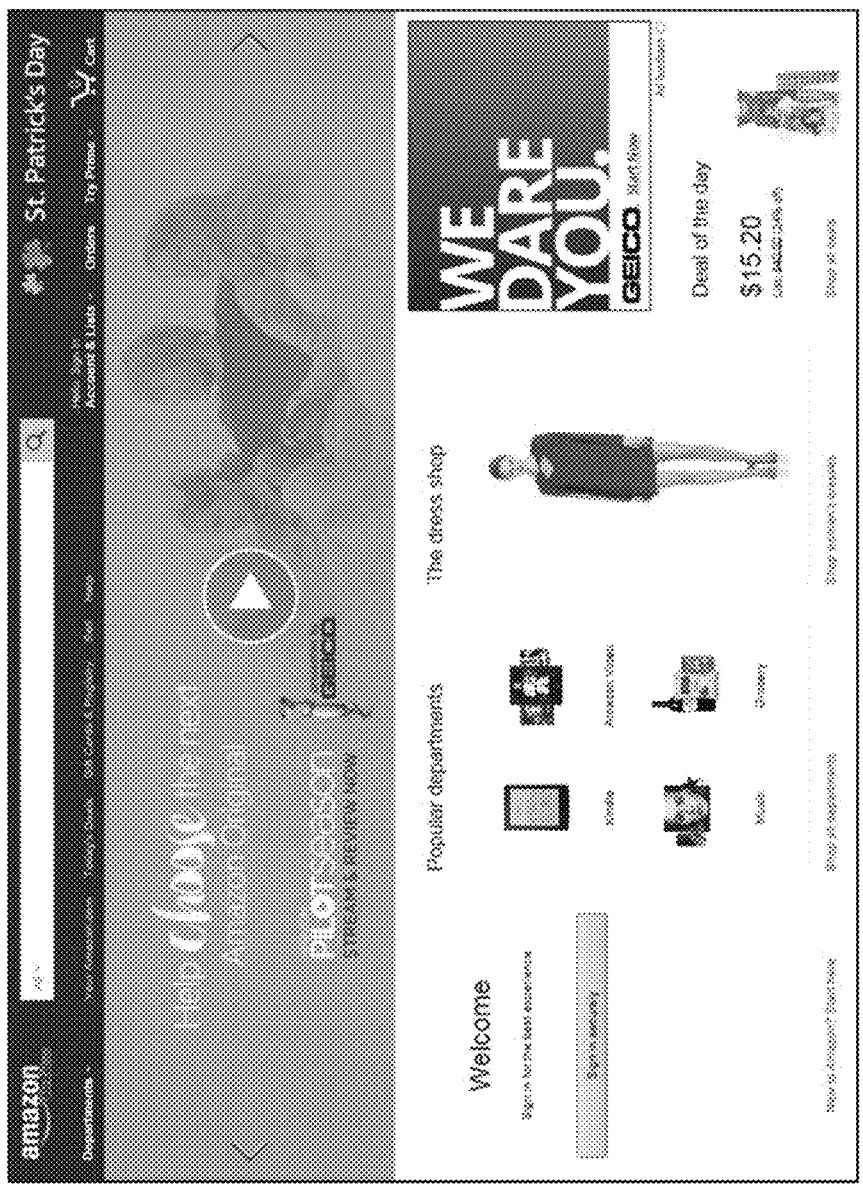
FIG. 5C depicts an interface through which a user can browse items offered for sale by an electronic commerce platform.

FIG. 5C depicts an interface through which a user can browse items offered for sale by an electronic commerce platform, which could range in size from large retailers (e.g., Amazon.com®) that sell a wide assortment of products to small retailers that sell a single product. The interface may be viewed by the user on an HMD or some other computing device (e.g., computing device 306 of FIG. 3). A scent delivery system communicatively coupled to the HMD or the other computing device may enable scent-based browsing of the items offered for sale.

For example, a user may execute a search for perfumes or colognes through the interface, and then browse different items returned by the search. Similarly, the user might visit a virtual perfume shop or cologne shop where the user is able to view and smell different items offered for sale. As another example, the user could browse scents and purchase a scent (e.g., as part of a gift that is paired with a cinematic movie, digital card, etc.) that will be experienced by the user or another user.

A scent delivery system may permit the user to test the scents of different physical items (e.g., perfumes or colognes) before placing an online order for a physical item. Said another way, the scent delivery systems introduced here may enable scent-based browsing. Although the scent of a perfume or cologne is not likely to be replicated exactly, the scent(s) dispensed by a scent delivery system enable the user to have a better understanding of what he/she is buying (e.g., whether a perfume/cologne is intended to have a sweet fragrance, a floral fragrance, etc.).

As noted above, scent delivery systems dispense scent(s) upon executing instructions that correspond to the content being presented to the user. Here, for example, the scent delivery system can determine whether to dispense a scent based on instructions provided by a source of the content (e.g., a producer of a cinematic video or a merchant associated with an electronic commerce platform). In some embodiments the instructions are embedded within the content (e.g., in the metadata of a cinematic video), while in other embodiments the instructions are included in an instruction set that accompanies the content and is separately executable by the processor.

Moreover, the instructions could be initially created in several different ways. For example, a manufacturer of the item (e.g., a perfume manufacturer) may select scent(s) from a list of scents that are commonly available to scent delivery systems. As another example, instructions could be automatically created by parsing a product listing to identify tag words that are used to describe the item. The tag word(s) may be used to identify the scent(s) that are most appropriate. One skilled in the art will recognize that these different techniques for creating instructions enable different levels of control in dispensing scents and accuracy in replicating fragrances. For instance, instructions provided by the manufacturer of the item are generally more accurate than instructions that are automatically created (e.g., by a service responsible for supporting scent functionality) based on information about the item.

Content (e.g., audiobooks and digital content, such as applications, games, and cinematic videos) can be specially designed for use with an HMD having a scent delivery system. However, older, non-scented content could also be repurposed for use with HMDs having a scent delivery system. For example, an administrator (e.g., a designer, writer, or individual consumer of content) may be able to tag older, non-scented content to create keyframes that cause the scent delivery system to dispense one or more scents. More specifically, the administrator could upload the older, non-scented content to an interface and manually specify which scent(s) should be dispensed, how much of each scent should be dispensed (e.g., a faint, medium, or strong aroma), when each scent should be dispensed, etc. A repurposing engine that is responsible for generating the interface may also be configured to automatically recommend these criteria (e.g., scent type, dispersal time, dispersal quantity) after reviewing and analyzing the older, non-scented content. Thus, older, non-scented content could be manually repurposed into scented content by an administrator and/or automatically repurposed into scented content by a repurposing engine. The older content could be non-visual content, such as an audiobook, or visual content, such as two-dimensional (2D) content or three-dimensional (3D) content.

FIG. 6 depicts a process 600 for attaching a scent delivery system to an HMD. One skilled in the art will recognize, however, that the scent delivery system could also be built into the HMD itself. A scent delivery system is initially provided to a user (e.g., an individual consumer of content, such as augmented or virtual reality content) (step 602). The scent delivery system could be designed to be paired with any HMD, a specific subset of HMDs (e.g., only those HMDs configured to present virtual reality content), or a specific type of HMD (e.g., Oculus Rift®, Microsoft HoloLens®, etc.).

Oftentimes, the scent delivery system will include one or more fasteners that enable the scent delivery system to be readily attached to, and then removed from, an HMD (step 604). For example, the structural frame of the HMD may include fasteners (e.g., cavities) configured to mate with corresponding features (e.g., protrusions) of a scent delivery system. In other embodiments, the scent delivery system is fixedly attached to the frame of the HMD using, for example, screws, nuts and bolts, or an adhesive material.

The user may also be able to readily replace one or more capsules housed within the scent delivery system (step 606). For example, in some embodiments the scent delivery system includes a compartment that is accessible when the scent delivery system is attached to the HMD, while in other embodiments the compartment is only accessible when the scent delivery is not attached to the HMD. The capsules could also be housed within a separate compartment that is connected to the scent delivery system. For example, a separate compartment that includes multiple capsules could be affixed to the side or back of the HMD. In such embodiments, the scent delivery system (or the HMD itself) can include channels for routing scented materials from the multiple capsules to pump(s) disposed near the user's nose.

The scent delivery system and/or the HMD can enable the user to modify whether a scent feature (also referred to as a "scent functionality") is enabled or disabled (step 608). For example, the scent delivery system could include a mechanical on/off switch or the HMD could display an electronic interface that allows the user to select whether the scent feature is engaged. When the scent feature is enabled, one or more scents can be dispensed by the scent delivery system (step 610). More specifically, the scent(s) can be dispensed at certain points in time, in response to determining a particular type of digital content is being shown, etc.

In some embodiments, scent circuitry (and, more specifically, a content-monitoring module) causes a scent to be automatically dispensed by the scent delivery system in response to determining a particular scene of digital content is being shown by the HMD. For example, an image of a field of flowers could trigger the production of a floral scent, while an ocean view may trigger the production of a salty scent. Additionally or alternatively, the production of a scent could be manually triggered by the user (e.g., by pushing a mechanical button on the scent delivery system or HMD, or by audibly delivering a command). Similarly, the production of a scent could be triggered by the scent circuitry based on motion data received from one or more motion sensors (e.g., inertial sensors or accelerometers) that are coupled to the HMD and/or the scent delivery system. When we want to smell an object in real life, we typically move our head closer to the object. In some embodiments, the HMD and/or the scent delivery system is able to replicate that experience by producing scent(s) in response to determining the user's head has begun moving toward where a digital object is presented in a digital environment. For example, the scent delivery system may dispense a floral scent upon determining that the user's head has moved toward the theoretical position of a digital flower, and then stop dispensing the floral scent upon determining the user's head has begun moving away from that position.

In some embodiments, the scent delivery system and/or the HMD facilitate dispersal of the scent(s) after a predetermined time period or in response to an action completed by the user. For example, a fan may be configured to periodically or continuously circulate air around the user's nose. As another example, a fan could begin running or more subtle scent(s) could be dispensed upon determining the user has performed an action with respect to the content being presented by the HMD (e.g., the user moves to a different virtual reality environment).

FIG. 7 depicts a process 700 for dispensing one or more scented materials by a scent delivery system that is attached to an HMD. Initially, scent circuitry of the scent delivery system receives an indication that a scent feature has been enabled (step 702). As noted above, the scent feature could be enabled using a mechanical switch on the scent delivery system, an electronic interface presented by the HMD, etc. The scent circuitry, meanwhile, can include a power supply, memory, processor(s), and/or communication module(s) that enable the scent delivery system to communicate with the HMD across a wired or wireless communication channel.

The scent delivery system can monitor the content presented by the HMD (step 704). The content could be, for example, visual content (e.g., cinematic videos, applications, or video games) or non-visual content such as audio files. The scent delivery system can then generate an output signal in response to determining a particular keyframe of the content has been reached (step 706). The term "keyframe" refers to an instance within the content (e.g., a visual frame or an audio frame) that causes one or more scented materials to be dispensed. The term can apply regardless of whether the experience is visual or non-visual. For example, both cinematic videos and audiobooks can have keyframe(s) arranged throughout their runtime.

The output signal could also include other metadata about the scented material(s) to be dispensed. For example, the output signal could specify which scented material(s) should be dispensed and the intensity (i.e., amount) of each scented material. The output signal (and any corresponding metadata) can be generated by a software module based on various user characteristics, such as age, gender, lifestyle, etc. For example, scent intensity may be increased proportional to the age of the user.

Typically, the output signal is transmitted to the scent circuitry of the scent delivery system (step 708). The scent circuitry is able to process the output signal in order to determine which scented material(s) are to be dispensed, how much of each scented material should be dispensed, etc. The scent circuitry can then cause pump(s) to dispense the scented material(s) toward the user's nose (step 710). The amount of scented material(s) released by the pump(s) may correspond to the content being presented by the HMD. For example, the amount of scented material dispensed by a pump may be reduced if the user is concurrently experiencing visual stimulation (i.e., digital content) that is related to the scent. Said another way, smaller amounts of scented material may be required when the user is also expected to experience significant visual stimulation and/or audible stimulation. For example, only a small amount of lemon scent may be necessary if a bowl of lemons or a pitched of lemonade are viewable at the same time, while a larger quantity of lemon scent may be needed if the user is walking through a digital citrus grove whose fruit is not easily viewable. Thus, scent circuitry may consider what each of the user's other senses are expected to experience at a given time. Realistic simulation of digital content requires that the strength, direction, frequency, and other features of any sensory stimuli must generally correspond to what is being presented by the HMD.

The scent delivery system and/or the HMD can also be configured to monitor the user's reaction to the scent (step 712). In some embodiments, the HMD and/or the scent delivery system include temperature sensor(s) that monitor whether the user's temperature has begun to rise and/or humidity sensor(s) that monitor whether the user has begun to sweat. Both of these occurrences may indicate overstimulation of the user's senses. Similarly, the HMD and/or the scent delivery system may include motion sensor(s) that monitor whether the user begins to move her head away from where the digital content is theoretically presented or whether the user has begun to shake her head. These actions may indicate the dispensed scent is too strong. Consequently, a fan may begin circulating the air around the user's nose or a neutralizing scent may be dispensed to eliminate or dilute the strong scent.

Unless contrary to physical possibility, it is envisioned that the steps described above may be performed in various sequences and combinations. For example, in some embodiments the user must replace the capsule(s) before the scent delivery system is attached to the HMD. Additional steps could also be included in some embodiments. In fact, other stimuli (e.g., gustatory or tactile, such as simulated wind) could also be altered based on the user's reaction. For example, the intensity of an air flow created by a fan (which is intended to simulate wind) may be lessened if one or more motion sensors indicate the user has begun turning her head away from the fan (i.e., away from the source of the stimulus).

Processing System

Figure 8:
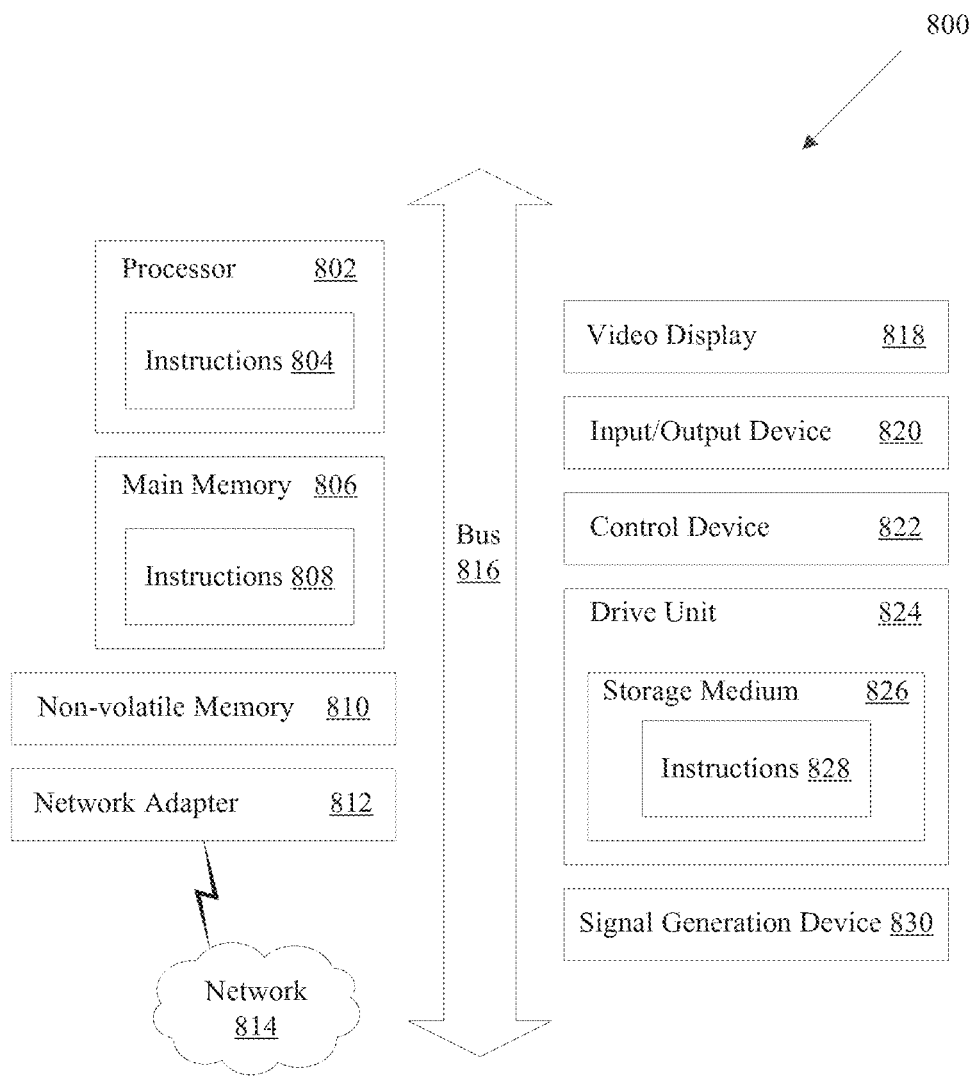
FIG. 8 is a block diagram illustration an example of a processing system in which at least some operations described herein can be implemented, consistent with various embodiments.

FIG. 8 is a block diagram illustrating an example of a processing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of an HMD (e.g., HMD 200 of FIG. 2), although the processing system 800 may be connected (e.g., wired or wirelessly) to the HMD. In a networked deployment, the processing system 800 may operate in the capacity of a server or a client machine in a client-server network environment, or as a peer machine in a peer-to-peer (or distributed) network environment.

The processing system 800 may be a server, a personal computer (PC), a tablet computer, a laptop computer, a personal digital assistant (PDA), a mobile phone, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An attachment that produces sensory stimuli to increase the realism of content presented by a head-mounted device, the attachment comprising:
   a structural frame that includes
      multiple fasteners for detachably connecting the attachment to the head-mounted device, and
      one or more outlets that allow air to circulate between an internal cavity formed by the structural frame and an external environment,
      wherein a user's nose is located within the internal cavity while using the attachment;
   a plurality of capsules that each include a scented liquid, wherein the plurality of capsules are removable from the attachment by the user; and
   a plurality of pumps that are configured to controllably dispense the scented liquids from the plurality of capsules into the internal cavity of the structural frame.

2. The attachment of claim 1, further comprising:
   scent circuitry configured to generate signals that specify how much of each scented liquid should be dispensed by each pump at a given time.

3. The attachment of claim 2, further comprising:
   one or more sensors that are coupled to the structural frame,
   wherein the one or more sensors are configured to produce a value for motion of the attachment, a skin temperature of the user, an ambient humidity within the internal cavity of the structural frame, or a combination thereof.

4. The attachment of claim 3, wherein the scent circuitry decreases a volume of scented liquid dispensed by each pump in response to determining the value exceeds a specified threshold.

5. The attachment of claim 1, further comprising:
   a fan configured to guide air from the internal cavity to the external environment through the one or more outlets of the structural frame.

6. The attachment of claim 5, wherein the fan continuously or periodically circulates the air within the internal cavity of the structural frame.

7. The attachment of claim 1, wherein the plurality of capsules are housed within a compartment that is accessible when the attachment is connected to the head-mounted device.

8. An attachment that produces sensory stimuli to increase the realism of content presented by a head-mounted device, the attachment comprising:
a structural frame that includes
multiple fasteners for detachably connecting the attachment to the head-mounted device, and
one or more outlets leading directly from an internal cavity formed by the structural frame to an external environment,
wherein the one or more outlets allow air to circulate between the internal cavity and the external environment,
wherein a user's nose is located within the internal cavity while using the attachment;
a reservoir housed within a compartment that is accessible to the user;
a pump configured to controllably dispense liquid from the reservoir; and
a fan configured to create an air flow that is guided toward the user and then to the external environment through the one or more outlets of the structural frame.

9. The attachment of claim 8, wherein the head-mounted device is configured to present a digital environment to the user.

10. The attachment of claim 9, wherein the air flow is modulated in a controlled manner to simulate wind that is present in the digital environment.

11. The attachment of claim 9, wherein the liquid is water, and wherein the pump dispenses water from the reservoir in a controlled manner to simulate rain.

12. The attachment of claim 9, wherein the liquid is a scented material, and wherein the pump dispenses scented material from the reservoir in a controlled manner to produce a scent.

13. The attachment of claim 12, wherein the reservoir is one of multiple reservoirs housed within the compartment, and wherein each reservoir of the multiple reservoirs holds a different scented liquid.

14. The attachment of claim 13, wherein the pump is one of multiple pumps, and wherein each pump of the multiple pumps independently dispenses a corresponding scented liquid from a corresponding reservoir responsive to signals provided by scent circuitry.

15. The attachment of claim 14, wherein the scent circuitry is communicatively coupled to a computing device across a network.

16. The attachment of claim 8, wherein the head-mounted device is a binocular head-mounted device configured to display virtual reality content.

17. The attachment of claim 8, wherein the head-mounted device is a monocular head-mounted device configured to display augmented reality content.

18. The attachment of claim 8, further comprising:
a processor operable to execute instructions stored in a memory; and
the memory that includes specific instructions for producing sensory stimuli.

19. The attachment of claim 18, wherein the specific instructions are provided by a source of content presented by the head-mounted device to the user.

20. The attachment of claim 18, wherein the specific instructions are automatically generated by scent circuitry that is communicatively coupled to the attachment.

21. The attachment of claim 18, wherein execution of the specific instructions causes the processor to:
perform content analysis to identify a keyframe within the content that is indicative of a source of a sensory stimulus;
generate an instruction for activating the pump, the fan, or both; and
forward the instruction to the pump, the fan, or both.

22. The attachment of claim 21, wherein the instruction specifies a strength, a direction, or a frequency of the sensory stimulus.

23. A method comprising:
receiving, by a processor, an indication that a first sensory functionality of an attachment detachably connected to a head-mounted device has been enabled by a user;
parsing, by the processor, digital content that is presented by the head-mounted device to the user to discover a first keyframe;
generating, by the processor, a first output signal in response to determining the first keyframe has been shown; and
transmitting, by the processor, the first output signal to a pump of the attachment,
wherein reception of the first output signal causes the pump to dispense a liquid from a reservoir that is housed within the attachment.

24. The method of claim 23, wherein the liquid is water, and wherein the pump dispenses water from the reservoir in a controlled manner to simulate rain.

25. The method of claim 23, wherein the liquid is a scented material, and wherein the pump dispenses scented material from the reservoir in a controlled manner to produce a scent that corresponds to an item shown in the digital content.

26. The method of claim 23, further comprising:
receiving, by the processor, an indication that a second sensory functionality of the attachment connected to the head-mounted device has been enabled by the user;
parsing, by the processor, the digital content that is presented by the head-mounted device to discover a second keyframe;
generating, by the processor, a second output signal in response to determining the second keyframe has been shown; and
transmitting, by the processor, the second output signal to a fan of the attachment, wherein reception of the second output signal causes the fan to create an air flow in a controlled manner to simulate wind.

27. The method of claim 26, wherein the first keyframe and the second keyframe are a same keyframe.

28. The method of claim 26, further comprising:
monitoring the user's reaction to the liquid dispensed by the pump;
monitoring the user's reaction to the air flow created by the fan; and
determining that the user's reaction to either stimulus is indicative of discomfort; and
altering a volume of the liquid dispensed by the pump, a force of the liquid dispensed by the pump, or an intensity of the air flow.

29. The method of claim 28, wherein monitoring the user's reaction to the liquid dispensed by the pump and monitoring the user's reaction to the air flow created by the fan comprises:
processing data signals generated by one or more sensors coupled to the structural frame of the head-mounted device, wherein the one or more sensors include a humidity sensor, a temperature sensor, a motion sensor, or a combination thereof.

30. The method of claim 23, wherein the processor is housed within a computing device that is communicatively coupled to the head-mounted device across a network.

* * * * *